UNITED STATES PATENT OFFICE.

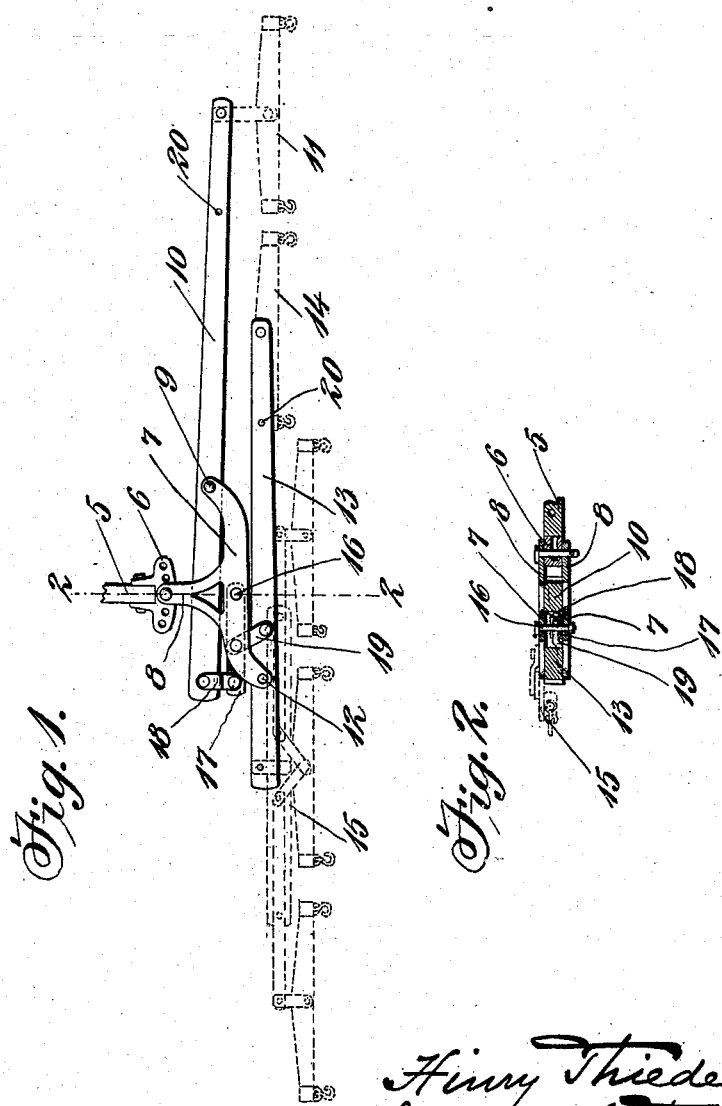

HINRY THIEDEMANN AND JURGEN H. THIEDEMANN, OF HICKMAN, NEBRASKA.

DRAFT-EVENER.

No. 900,897.  Specification of Letters Patent.  Patented Oct. 13, 1908.

Application filed January 3, 1908. Serial No. 409,121.

*To all whom it may concern:*

Be it known that we, HINRY THIEDEMANN and JURGEN H. THIEDEMANN, citizens of the United States, residing at Hickman, in the county of Lancaster and State of Nebraska, have invented certain new and useful Improvements in Draft-Eveners, of which the following is a specification.

This invention relates to draft-eveners and has for its object certain improvements over the devices shown in our former patents Nos. 774,343 and 819,097; and to this end the invention consists in a novel arrangement and combination of levers, and draft devices carried thereby, as will be described hereinafter and claimed.

In the accompanying drawing, Figure 1 is a plan view of the invention. Fig. 2 is a section on the line 2—2 of Fig. 1.

Referring specifically to the drawing, 5 denotes a plow-beam, and 6 the clevis thereof to which the evener is attached.

The supporting-frame of the evener comprises spaced plates 7 having at their edges an arm 8 whereby the evener is attached to the plow-clevis which may be a horizontal clevis, as shown, or any other form. The arm 8 is secured to the clevis in any suitable manner. The ends of the plates 7 are offset forwardly and rearwardly, respectively, and to the rearward offset end is pivoted, as indicated at 9, a lever 10, the long arm of which carries a swingletree shown in dotted lines at 11 in the drawing. To the forward offset end of the plates 7 is pivoted, as indicated at 12, a lever 13, the long end of which carries a swingletree 14, and to the short end of this lever is attached a trebletree 15 shown in dotted lines in the drawing. Between the plates 7 is pivoted, as indicated at 16, one end of an evener-lever 17. The free end of this lever is connected by a link 18 to the short arm of the lever 10, and also by a link 19 to the long arm of the lever 13 close to its pivot or fulcrum 12.

The arrangement of levers herein described distributes the draft evenly and eliminates all side draft. The evener can be reversed and worked right or left handed. By attaching the draft devices 11, 14 and 15 as shown, a five-horse evener is had. The devices may also be used in connection with four horses by substituting a doubletree for the trebletree 15 and attaching the swingletrees 11 and 14 at the points indicated at 20 in the drawing which are nearer the pivots 9 and 12, whereby the leverage is readjusted.

The evener is simple in construction and can be cheaply manufactured, and it effectually serves the purpose for which it is intended.

In the drawing, the evener is shown applied to a plow, but it is to be understood that it can be used in connection with a harvester, mower, and other machinery requiring a number of draft animals and in which it is desirable to eliminate side draft.

We claim:—

1. A draft-evener comprising a supporting-frame, a lever pivoted thereto, draft devices carried by the long arm of said lever, an evener-lever pivoted to the frame, a connection between the evener-lever and the short arm of the first mentioned lever, a third lever pivoted to the supporting-frame, draft devices carried by both arms of the last-mentioned lever, and a connection between the long arm of the last-mentioned lever and the evener-lever.

2. A draft-evener comprising a supporting-frame having at one end a rearward extension and at the opposite end a forward extension, a lever pivoted to the rearward extension, draft devices carried by the long arm of said lever, an evener lever pivoted to the frame, a connection between the evener lever and the short arm of the first-mentioned lever, a third lever pivoted to the forward extension, draft devices carried by both arms of the last-mentioned lever, and a connection between the long arm of the last mentioned lever and the evener lever.

In testimony whereof we affix our signatures, in presence of two witnesses.

HINRY THIEDEMANN.
JURGEN H. THIEDEMANN.

Witnesses:
W. P. LARSH,
E. A. BOELL.